United States Patent
Ingham

(10) Patent No.: US 12,460,756 B2
(45) Date of Patent: Nov. 4, 2025

(54) PIVOTALLY ADJUSTABLE FLUID COUPLING ASSEMBLY, AND METHOD OF USING SAME

(71) Applicant: Seth Ingham, N. Las Vegas, NV (US)

(72) Inventor: Seth Ingham, N. Las Vegas, NV (US)

( * ) Notice: Subject to any disclaimer, the term of this patent is extended or adjusted under 35 U.S.C. 154(b) by 0 days.

(21) Appl. No.: 18/639,234

(22) Filed: Apr. 18, 2024

(65) Prior Publication Data

US 2024/0353034 A1    Oct. 24, 2024

Related U.S. Application Data

(60) Provisional application No. 63/460,397, filed on Apr. 19, 2023.

(51) Int. Cl.

| | |
|---|---|
| *F16L 27/08* | (2006.01) |
| *F16L 27/04* | (2006.01) |
| *F16L 37/248* | (2006.01) |
| *F16L 37/52* | (2006.01) |

(52) U.S. Cl.
CPC ........... *F16L 27/0808* (2013.01); *F16L 27/04* (2013.01); *F16L 37/248* (2013.01); *F16L 37/52* (2013.01)

(58) Field of Classification Search
CPC ..... F16L 27/0808; F16L 27/04; F16L 27/053; F16L 27/06; F16L 27/073; F16L 37/50; F16L 37/52; F16L 37/107; F16L 37/24; F16L 37/242; F16L 37/248; F16L 37/252
See application file for complete search history.

(56) References Cited

U.S. PATENT DOCUMENTS

| | | | | |
|---|---|---|---|---|
| 1,167,355 A | * | 1/1916 | Everson | F16L 27/04 |
| 1,187,642 A | * | 6/1916 | Milz | F16L 27/04 |
| 1,935,425 A | | 11/1933 | Wiggins | |
| 2,098,188 A | * | 11/1937 | Kinmont | F16L 27/04 |
| 3,276,796 A | * | 10/1966 | Daniel | F16L 37/52 |
| 3,692,337 A | | 9/1972 | Mischel | |

(Continued)

FOREIGN PATENT DOCUMENTS

| | | | |
|---|---|---|---|
| DE | 102010044398 A1 | * 3/2012 | |
| GB | 2151323 A | * 7/1985 | F16L 27/0808 |

OTHER PUBLICATIONS

DE-102010044398-A1—Machine Translation—English (Year: 2012).*

*Primary Examiner* — William S. Choi
(74) *Attorney, Agent, or Firm* — Carrier, Shende & Associates P.C.; Fulchand P. Shende; Joseph P. Carrier

(57) ABSTRACT

A fluid coupling assembly is usable to connect two pipes together, while allowing a limited amount of relative pivotal movement therebetween. The assembly includes three primary components: an inner ring, an outer ring which receives and seats a portion of the inner ring therein, and an outer collar member, which fastens the inner ring to the outer ring. Portions of the described components cooperate to form a modified ball and socket connection, in order to permit such limited pivotal movement. The assembly also includes a number of sealing members for ensuring a fluid seal between the inner and outer rings. The axes of two solid joined pipes form an angle while maintaining a fluid seal at the juncture between the two pipes. A method of joining two pipes includes using the fluid coupling assembly. The coupling assembly withstands vibrations without causing leak of a pressurized fluid flowing therethrough.

17 Claims, 13 Drawing Sheets

(56) References Cited

U.S. PATENT DOCUMENTS

| | | | | |
|---|---|---|---|---|
| 3,712,645 | A * | 1/1973 | Herter | F16L 27/06 |
| 3,944,263 | A * | 3/1976 | Arnold | F16L 37/52 |
| 3,997,198 | A | 12/1976 | Linder | |
| 4,236,737 | A | 12/1980 | Herbert et al. | |
| 4,620,728 | A | 11/1986 | Barth et al. | |
| 6,328,350 | B1 | 12/2001 | Leonhardt | |
| 6,386,595 | B1 | 5/2002 | Peppel | |
| 6,811,188 | B2 | 11/2004 | Haviland | |
| 7,021,675 | B2 | 4/2006 | Lawson | |
| 7,735,880 | B2 | 6/2010 | Ohlsson | |
| 2008/0122221 | A1 * | 5/2008 | Bridgewater | F16L 27/04 |
| 2018/0023738 | A1 * | 1/2018 | Mathers | F16L 27/053 |

* cited by examiner

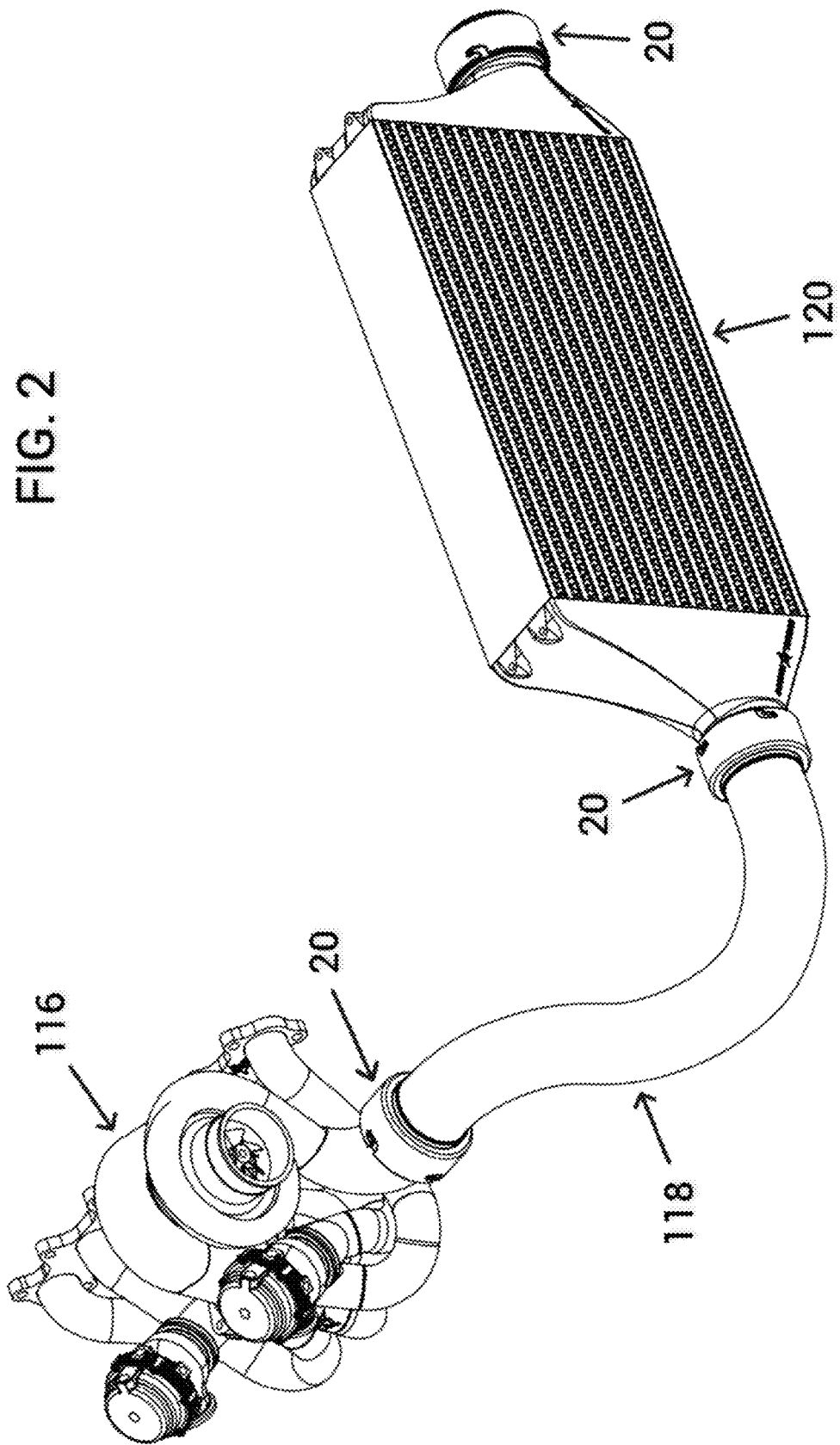

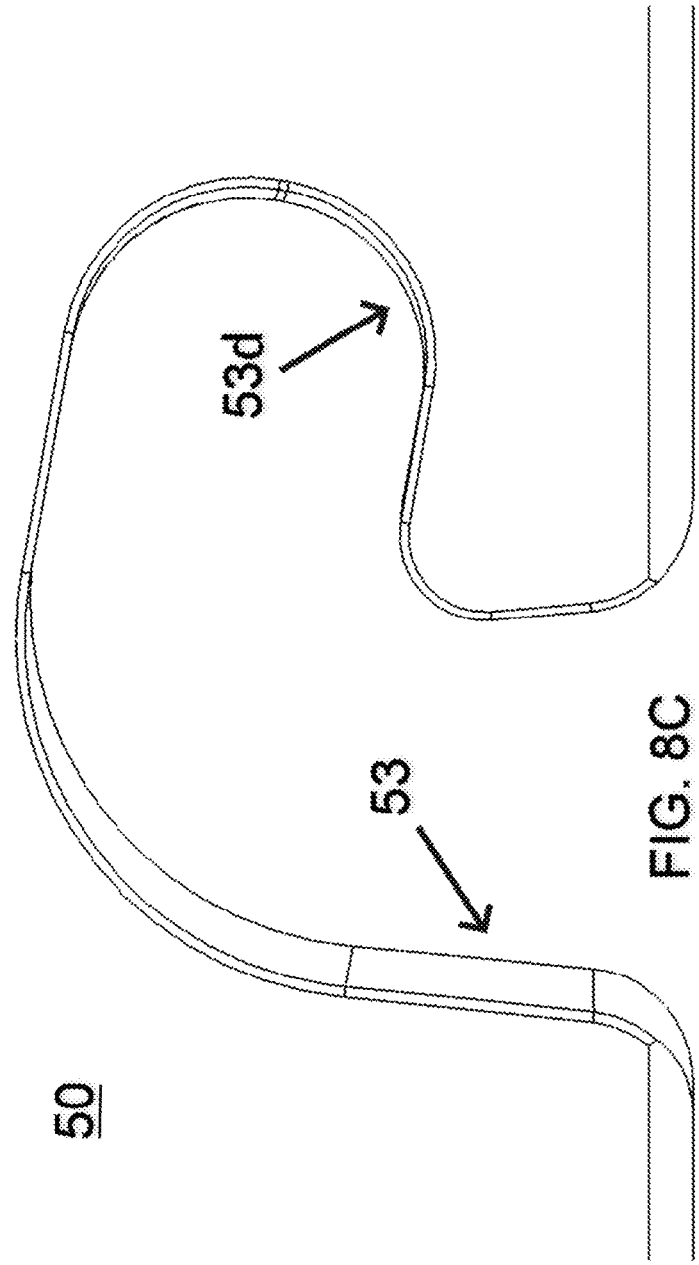

PIVOTALLY ADJUSTABLE FLUID COUPLING ASSEMBLY, AND METHOD OF USING SAME

CROSS-REFERENCE TO RELATED APPLICATIONS

The present application claims priority under 35 USC § 119 to U.S. Provisional Patent Application No. 63/460,397, filed on Apr. 19, 2023. The entire subject matter of this priority document, including specification, claims and drawings thereof, is incorporated by reference herein.

BACKGROUND OF THE INVENTION

1. Field of the Invention

The present invention relates to a pivotally adjustable fluid coupling assembly, and also to a method of using the coupling assembly. More particularly, the present invention relates to a pivotally adjustable fluid coupling assembly usable to join two pipes together, and which permits a first one of the pipes to pivotally move in relation to a second one of the pipes.

2. Description of the Background Art

A number of different adjustable fluid couplings are known. One of the commonly used adjustable fluid couplings is a Wiggins clamp, which uses a two-piece hinged clamshell design together with an internal sleeve ring and a number of sealing rings, which provide approximately six degrees of pivotal motion between two pipes joined by the coupling. Wiggins clamps are widely known and commercially available.

Examples of some other known fluid couplings include those described in U.S. Pat. Nos. 1,935,425, 3,692,337, 3,997,198, 4,236,737, 4,620,728, 6,328,350, 6,386,595, 6,811,188, 7,021,675, and 7,735,880.

Although the known fluid coupling devices are usable for their intended purposes, a need still exists in the art for an improved fluid coupling assembly which is usable for joining two pipes together, while permitting some angular movement therebetween. In particular, there is a need for an improved fluid coupling which will overcome the deficiencies in known art, and which will provide an increased range of movement.

SUMMARY OF THE INVENTION

Accordingly, it is an object of the present invention to provide a fluid coupling, and method of using the coupling, which is usable to join two pipes together, and which permits a first one of the pipes to pivotally move in relation to a second one of the pipes, such that the axes of the two pipes form an angle, while maintaining a fluid seal at the juncture between the two pipes.

It is another object of the invention to provide a sealed fluid coupling, of the type described, which can be used with a pressurized fluid.

It is still another object of the invention to provide a fluid coupling which can withstand vibration without leaking.

Although the fluid coupling assembly is designed and configured to join two pipes together, and these two pipes may be welded on to, or otherwise attached to elements of the assembly prior to or during installation thereof, the pipes themselves are not components of, and do not form part of the inventive structure.

As noted, a fluid coupling assembly according to a first illustrative embodiment of the present invention is usable to connect two pipes together, and includes three primary components: an inner ring member, an outer ring member which receives and seats a portion of the inner ring member therein, and an outer collar member, which fastens the inner ring member to the outer ring member, while allowing a limited amount of relative pivotal movement therebetween. The fluid coupling assembly also includes a number of sealing members for ensuring a fluid seal between the inner and outer ring members.

The outer ring member is a generally cylindrical member having a central axis. The outer ring member includes a ring body configured to be connected to a first one of the two pipes. The ring body has both an inner diameter and an outer surface with a first engaging structure thereon, which is connectable to a second engaging structure on the outer collar member. The first engaging structure may include male threading, pin members extending outwardly from the ring body, or other engaging structure.

The outer ring member also includes an annular flange formed coaxially and integrally with the ring body, the annular flange having an inner surface defining a concave wall portion.

The fluid coupling assembly according to the illustrative embodiment also includes a generally cylindrical inner ring member including a first wall section having a maximum diameter portion, where the first wall section fits nestingly inside of the concave wall portion of the outer ring member. The first wall section has a convex outer surface with at least one circumferential groove formed therein to receive a first sealing member.

The inner ring member also includes a second wall section formed coaxially and integrally with the first wall section and configured to be connected to a second pipe. The second wall section has a medial portion with an outside diameter smaller than the maximum diameter portion of the first wall section.

The fluid coupling assembly according to the illustrative embodiment also includes a generally cylindrical outer collar member for selectively connecting to the outer ring member, and for adjustably joining the inner and outer ring members together such that the inner ring member is pivotally movable in relation to the outer ring member. The outer collar member includes a connecting edge portion having a second engaging structure formed therein for selectively engaging the first engaging structure of the outer ring member, to temporarily and disengagably lock the outer collar member to the outer ring member.

The outer collar member further has retaining structure extending radially inwardly thereon for supportively receiving the first wall section of the inner ring member therein and for retaining the first wall section of the inner ring member in abutting engagement with the concave wall portion of the outer ring member.

The first engaging structure of the outer ring member may be comprised of a plurality of outwardly extending pin bosses, arranged radially around the main ring body of the outer ring member and spaced apart from one another, and where these pin bosses are used, the second engaging structure may include a plurality of shaped grooves formed in the connecting edge portion of the outer collar member and configured to slidably receive the pin bosses of the outer ring member therein. Where used, these may be L-shaped grooves, and if desired, these grooves may extend through the entire width of the outer collar member at the connecting edge portion.

Optionally, the outer collar member may also have one or more internal circumferential groove(s) formed in an inner surface thereof, to receive one or more additional sealing member(s).

Also optionally, the outer collar member may have a cradle section formed coaxially and integrally with the connecting edge portion, the cradle section having an inner surface defining a second concave wall portion which is alignable with the concave wall portion of the outer ring member when the outer collar member is joined thereto.

Where this cradle section is provided, the first and second concave wall portions cooperate to form a socket configured to receive the convex first wall section of the inner ring member.

The present invention also relates to a method of attaching two pipes together while permitting limited pivotal movement therebetween.

The method includes a first step of sliding an outer collar member over a first pipe.

The method also includes a second step of attaching the first pipe to an outer ring member having a concave wall portion, the outer ring member having a first engaging structure.

The method also includes a step of attaching a second pipe to an inner ring member comprising a first wall section which fits nestingly inside of the concave wall portion of the outer ring member, the first wall section having a convex outer surface.

The first through third steps may be performed in any order.

The method also includes a step of inserting the inner ring member into the outer ring member such that a maximum diameter portion of the inner ring member fits nestingly inside of the concave wall portion of the outer ring member.

The method also includes a step of connecting the inner and outer ring members together by removably attaching the outer collar member to the outer ring member, the outer collar member including a connecting edge portion having a second engaging structure formed therein, the second engaging structure interlocking with the first engaging structure of the outer ring member This step may involve twisting the outer collar member in relation to the outer ring member.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 2 is an environmental perspective view of a turbocharger, intercooler and connecting hose, which is one example of an application using three fluid coupling assemblies according to the present invention.

FIG. 8C is a detail view of a portion of the outer collar member of FIG. 8A.

DETAILED DESCRIPTION

It should be understood that only structures and methodology needed for illustrating selected embodiments of the present invention are described herein. Other conventional structures, and those of ancillary and auxiliary components of the system, will be known and understood by those skilled in the art.

Referring now to FIGS. 1A through 5, a fluid coupling assembly according to a first illustrative embodiment of the invention is shown generally at 20. The fluid coupling assembly 20 is usable to join two solid pipes, such as those shown at 90 and 92 in FIGS. 1B-1C, together in a way which permits a first one 90 of the pipes to pivotally move in relation to a second one 92 of the pipes. Such relative movement allows the axes of the two pipes to form an angle, while maintaining a fluid seal at the juncture between the two pipes.

Figure 3A:
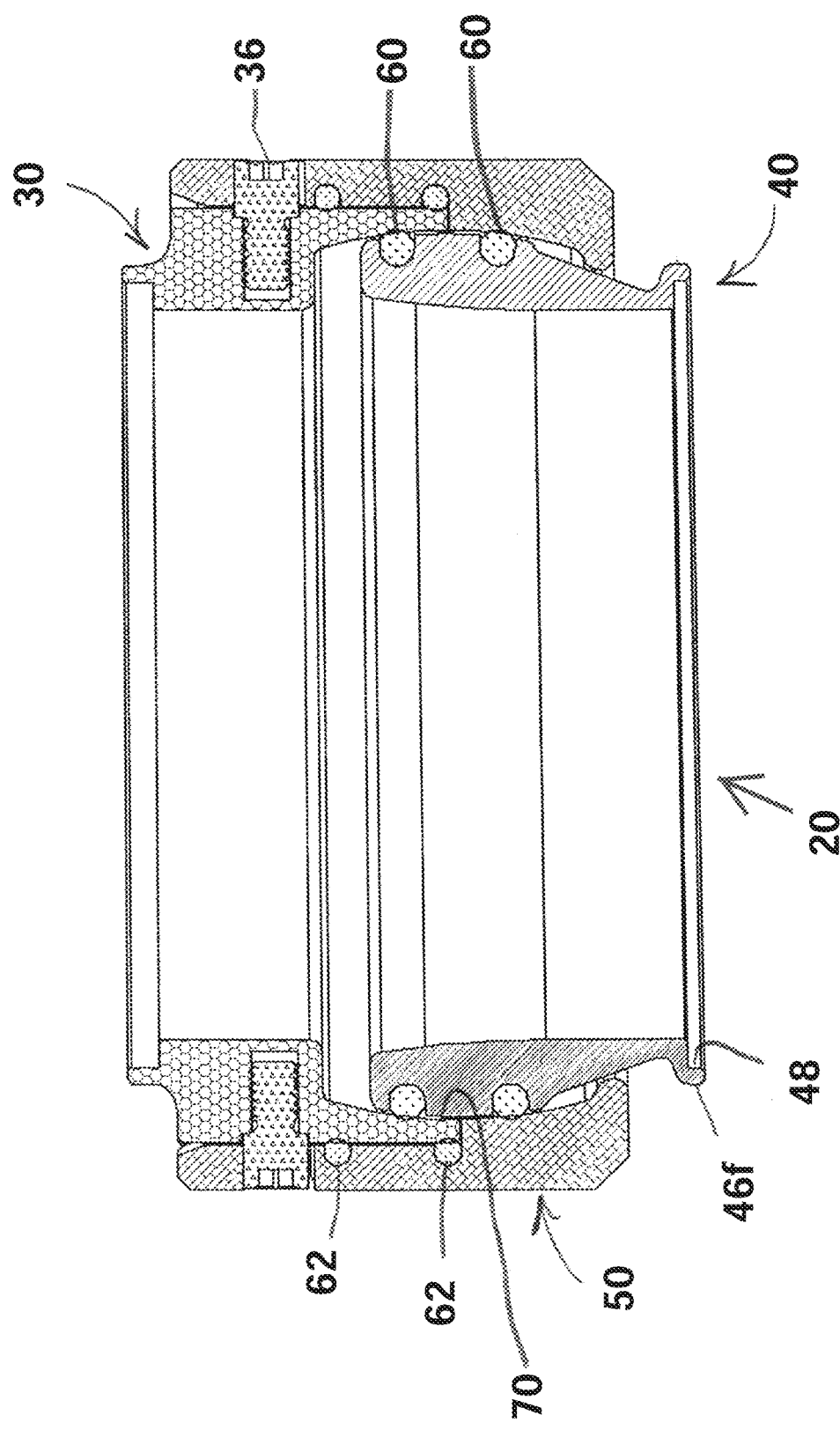
FIG. 3A is a central cross-section of the fluid coupling assembly of FIG. 1A, with an inner ring member shown of the assembly shown in a central position.
Figure 3B:
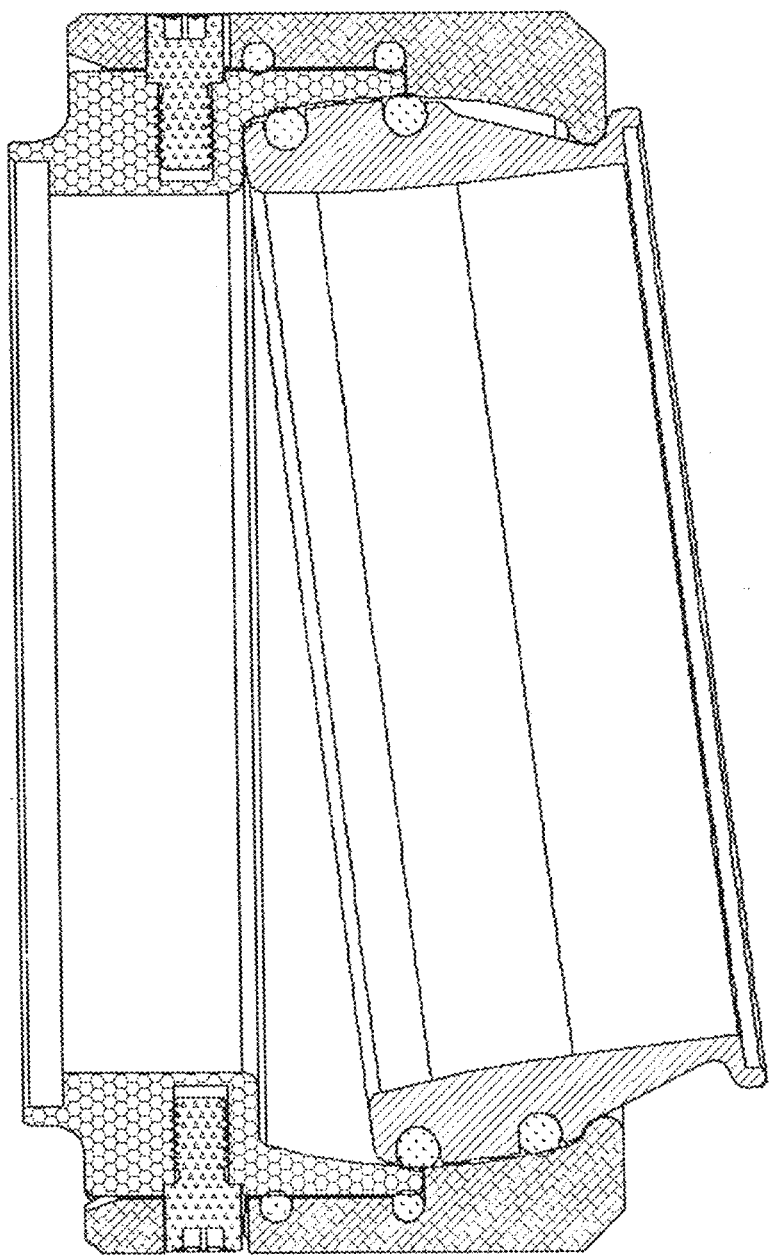
FIG. 3B is a central cross-section of the fluid coupling assembly of FIG. 1A, with the inner ring member shown pivoted toward the right side.
Figure 3C:
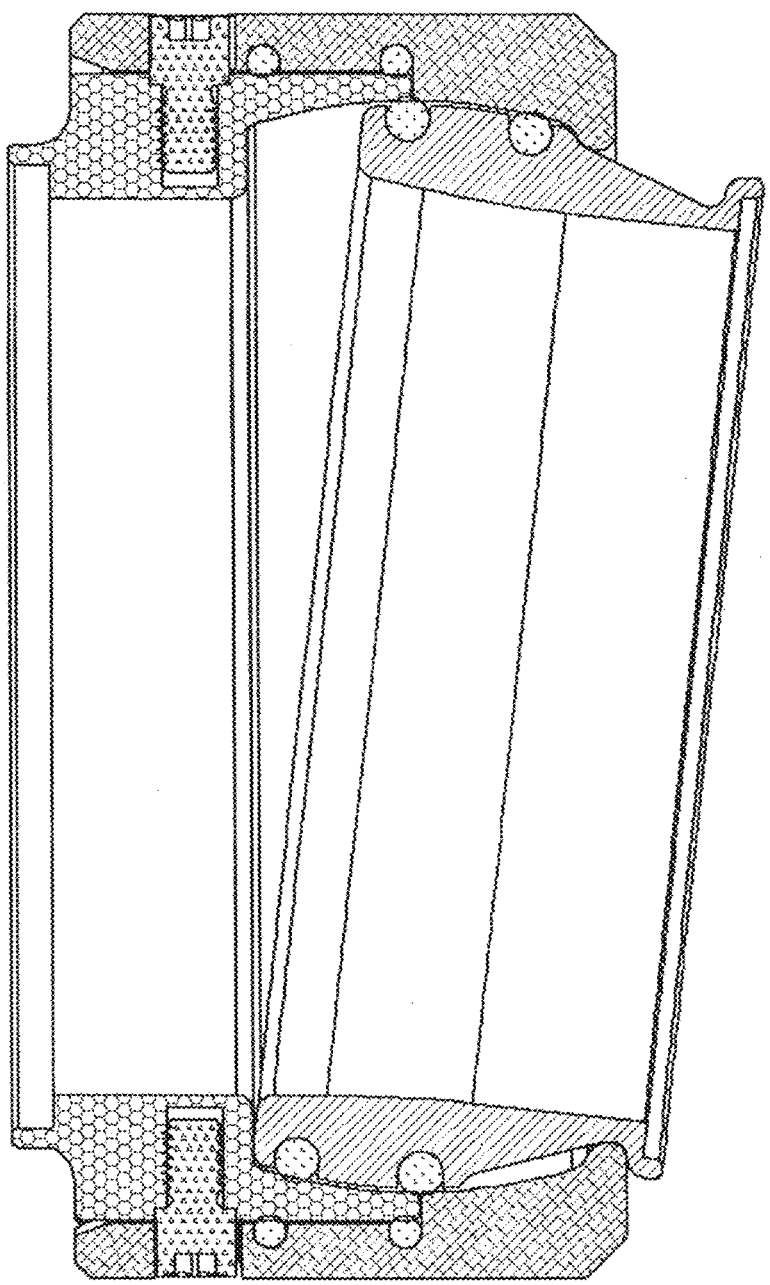
FIG. 3C is a central cross-section of the fluid coupling assembly of FIG. 1A, with the inner ring member shown pivoted toward the left side.

As seen in FIGS. 3A-3C, the fluid coupling assembly 20 of the present invention is capable of adjusting in an amount up to an angle of 15 degrees or greater, depending on the details of construction, from an aligned linear configuration (shown in FIG. 3A) where the axes of the rings are parallel.

Although the fluid coupling assembly 20 hereof is designed and configured to join two pipes such as those shown at 90, 92 together, and these two pipes may be respectively welded on to, or otherwise attached to elements of the inventive assembly prior to installation of the assembly in an application thereof, the pipes 90, 92 themselves are not components of the inventive structure.

The fluid coupling assembly 20 is configured to withstand vibration without leaking, and can be used with a pressurized fluid such as, for example, water, compressed air or a liquid coolant.

Referring now to FIG. 2, one exemplary application where the fluid coupling assembly 20 hereof may be used is shown. In the depicted application, the fluid coupling assembly is used as a connecting component in routing compressed air from a turbocharger or supercharger, through ducting and an intercooler 120, on its way to a throttle body (not shown).

Three fluid coupling assemblies 20 are shown in FIG. 2, including at a first junction between an outlet of a turbocharger 116 and a routing hose 118, at a second junction between the routing hose and an inlet to the intercooler 120, and at a third junction at an outlet of the intercooler.

Figure 4:
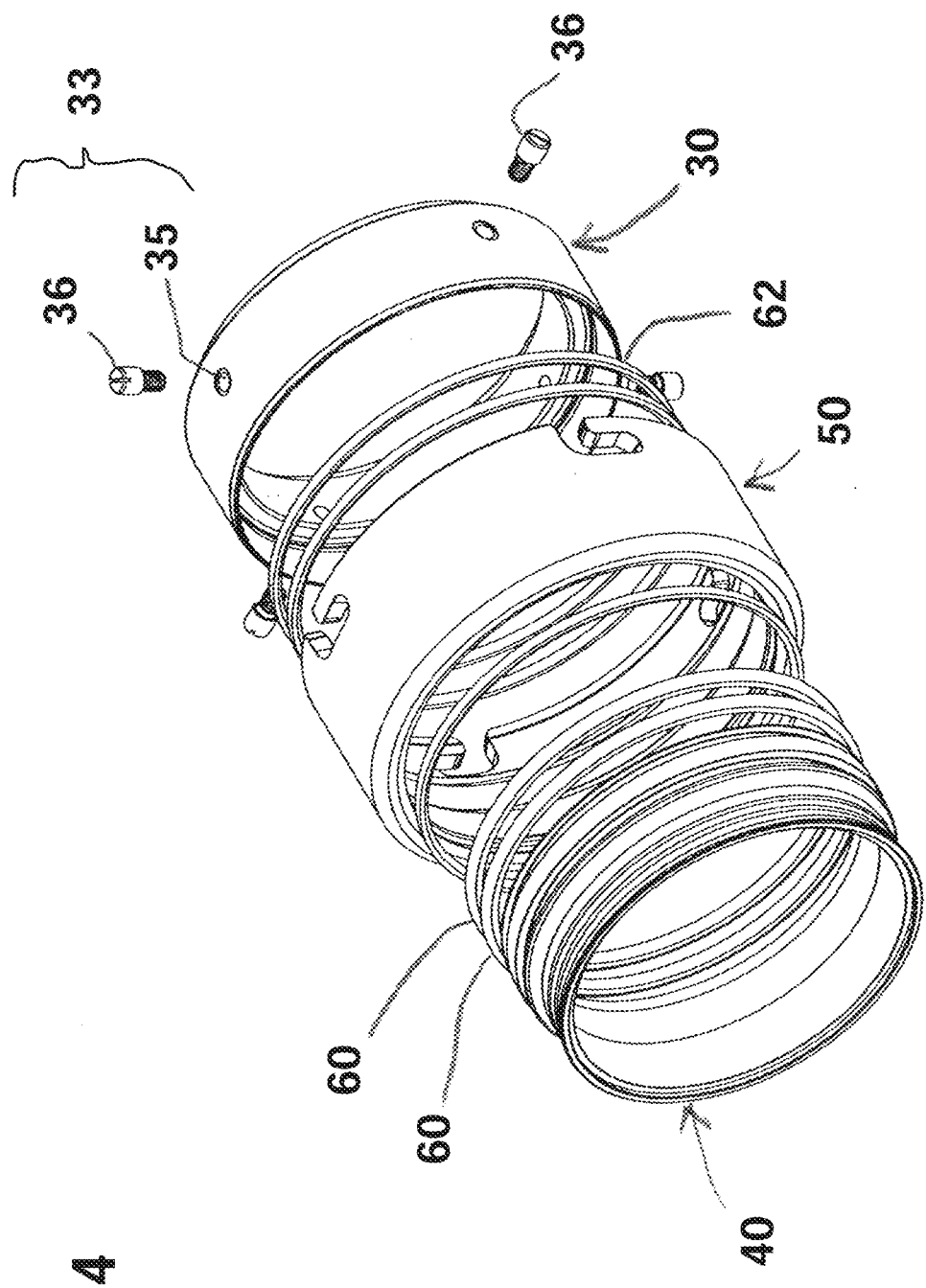
FIG. 4 is an exploded perspective view of the fluid coupling assembly of FIG. 1A.
Figure 5:
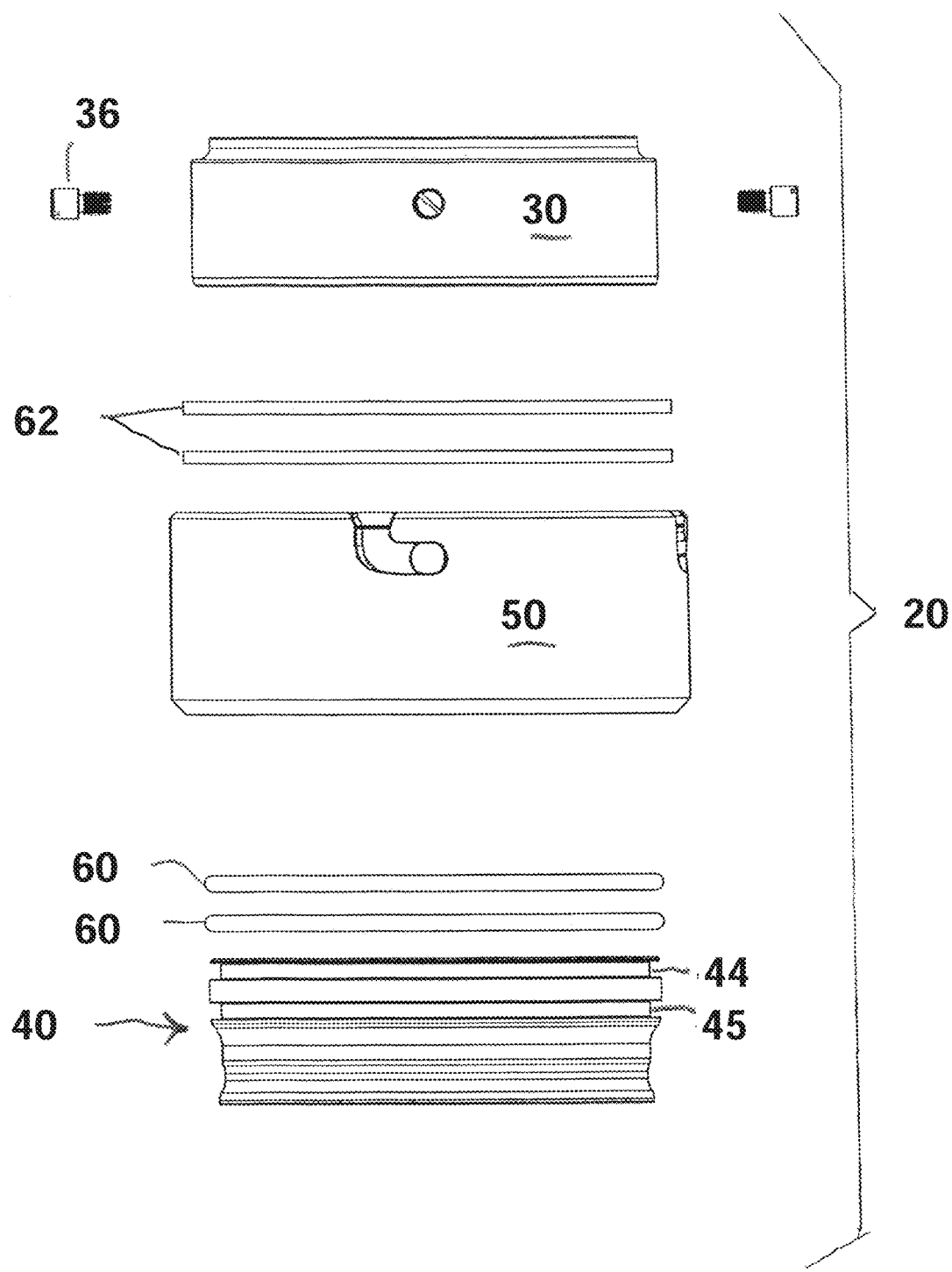
FIG. 5 is an exploded plan view of the fluid coupling assembly of FIG. 1A.

Referring also to FIGS. 3A-3C as well as FIGS. 4 and 5, the fluid coupling assembly 20 according to the illustrated embodiment of the present invention includes three primary components, which are an inner ring member 40, an outer ring member 30 which receives and seats a portion of the inner ring member therein, and an outer collar member 50 which slidably fits over the outer ring member, and which fastens the inner ring member to the outer ring member while allowing a limited amount of relative pivotal movement therebetween.

The fluid coupling assembly 20 also includes a number of sealing members 60, 62 for ensuring a fluid seal between the inner and outer ring members 40, 30.

Outer Ring Member

Figure 6A:
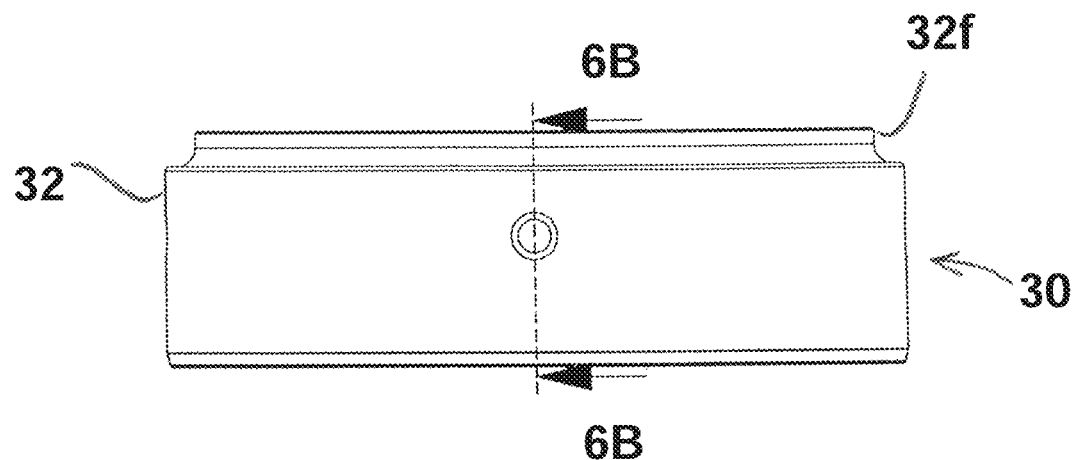
FIG. 6A is a side plan view of an outer ring member which is a component part of the fluid coupling assembly of FIG. 1A.
Figure 6B:
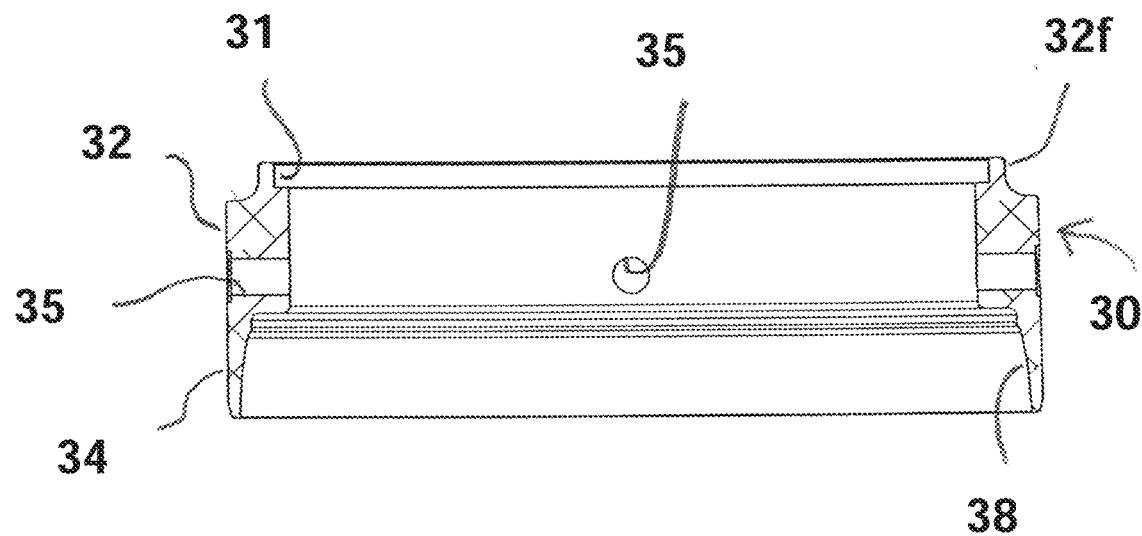
FIG. 6B is a central cross-sectional view of the outer ring member of FIG. 6A, taken along the line 6B-6B.

Referring also to FIGS. 6A and 6B, the outer ring member 30 is a generally cylindrical member having a central axis. The axis is in the center of the outer ring member, parallel to the dashed line in FIG. 6A where the sectional cut for FIG. 6B is taken. The outer ring member 30 may be formed of metal or a durable plastic material, and includes a ring body 32 configured to be connected to a first one 90 of the two pipes 90, 92. The outer ring member 30 also includes an annular flange 34 formed coaxially and integrally with the ring body 32.

Figure 1A:
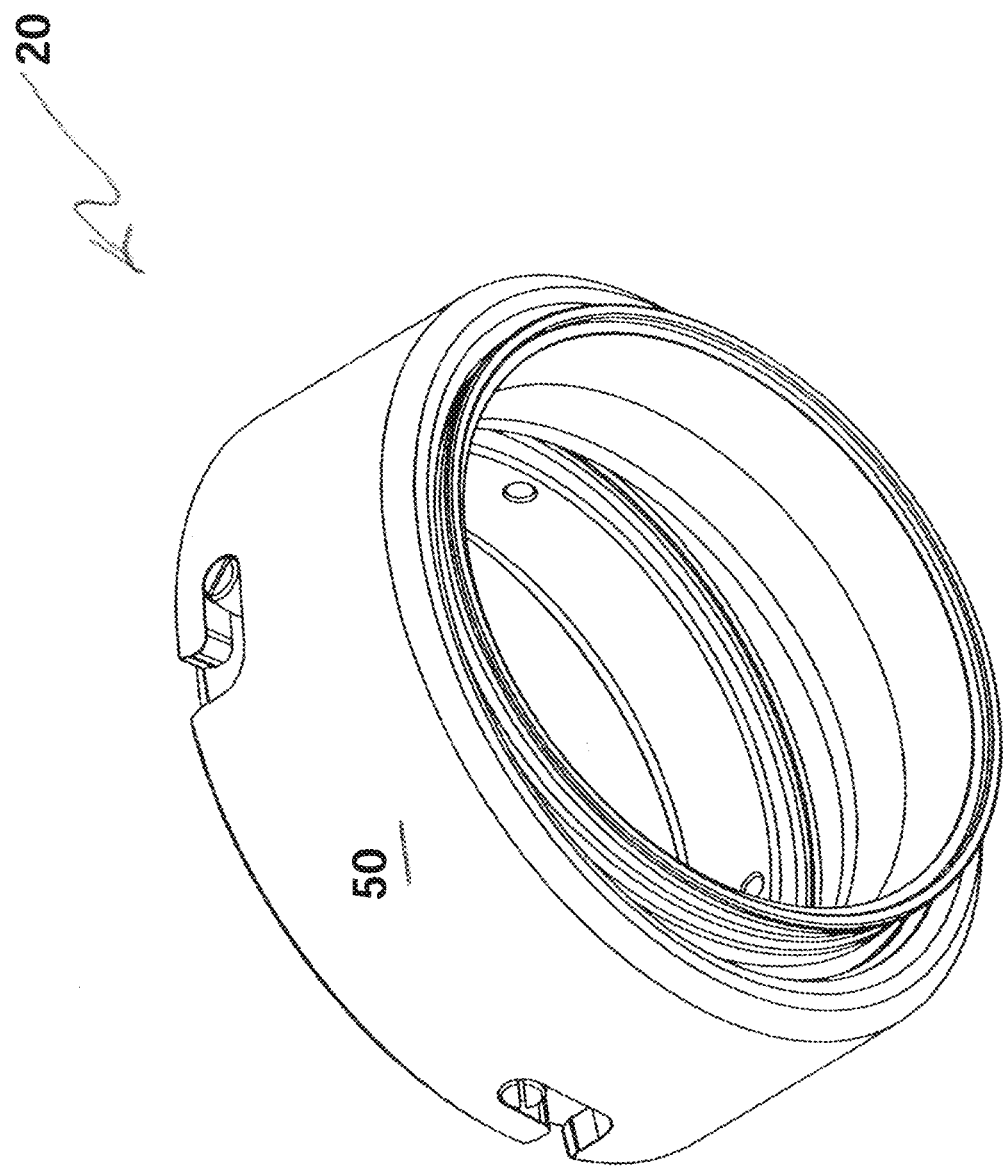
FIG. 1A is a perspective view of a fluid coupling assembly according to an illustrative embodiment of the present invention.
Figure 1B:
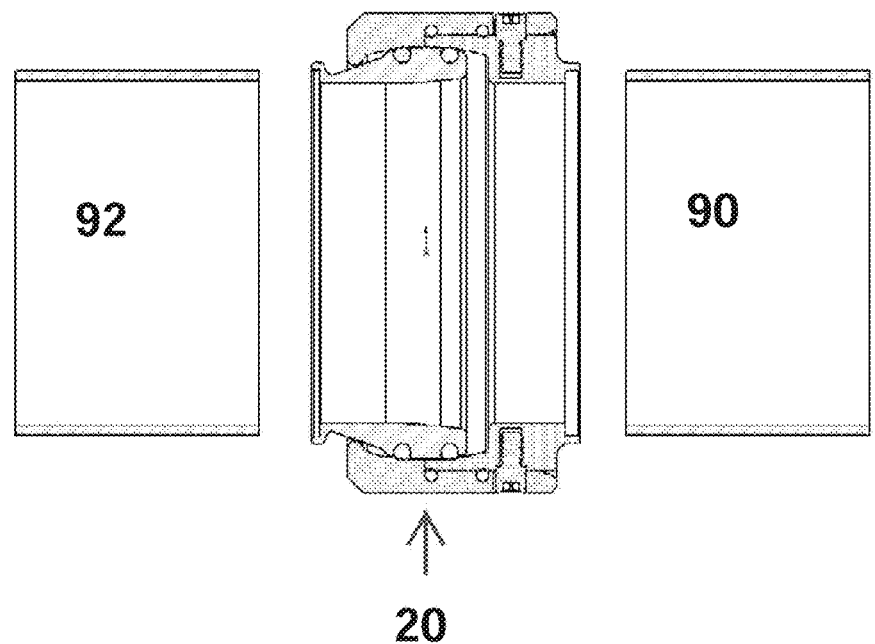
FIG. 1B is a cross-sectional view of the fluid coupling assembly of FIG. 1A, also showing two pipes ready to be joined together by the fluid coupling.
Figure 1C:
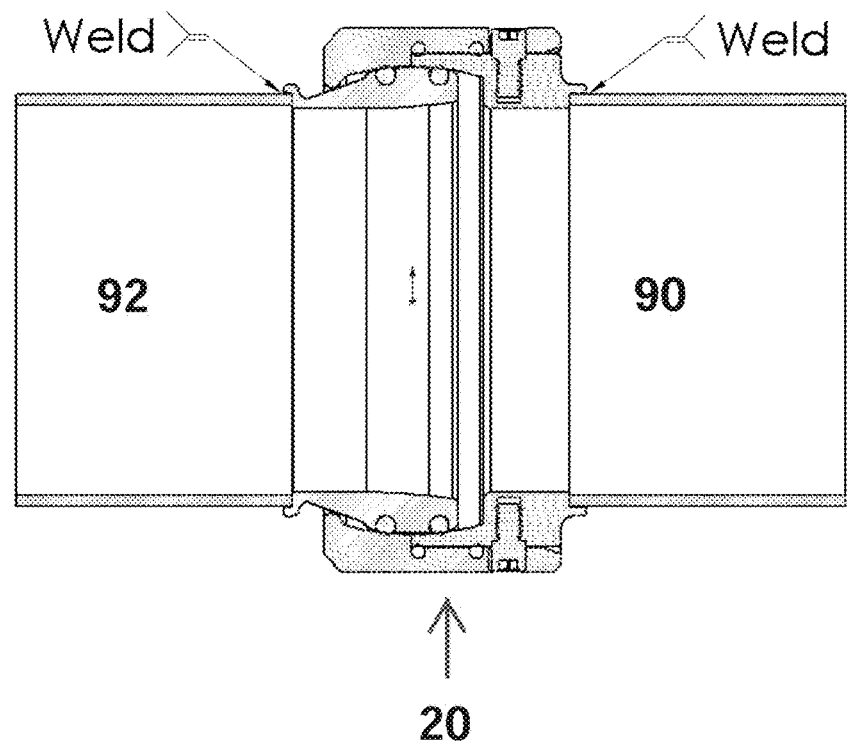
FIG. 1C is a cross-sectional view of the fluid coupling assembly and pipes of FIG. 1B, showing the two pipes and the fluid coupling joined together.

Optionally, the ring body 32 may include a narrowed-diameter connecting flange 32*f* having a circular groove 31 formed therein to nestingly receive a portion of the first pipe 90 therein. As shown in FIG. 1C, the first pipe 90 may be welded or otherwise attached to the outer ring member 30 at the connecting flange 32*f*.

Other ways of attaching the first pipe 90 to the outer ring member 30 include threadably attaching, using a barbed fitting for connecting to a hose, swaging (or swedging), bolting on using appropriate fasteners, or using a pinch clamp.

The ring body 32 of the outer ring member 30 has both an inner diameter and an outer surface with a first engaging structure 33 (FIG. 4) thereon, where this first engaging structure is connectable to a second engaging structure on the outer collar member 50, as will be further described herein.

The first engaging structure 33 may include male threading, integrally formed pin members extending outwardly from the ring body, threaded fasteners 36 which fit into threaded openings 35 formed in the ring body 32, or other engaging structure known in the art.

In the depicted embodiment, the first engaging structure 33 includes a plurality of female threaded bores 35 formed in a side wall of the ring body 32, and a corresponding number of cylindrical fasteners 36 which include male threads for connecting to the threaded bores. These fasteners 36 may be made of high-strength steel or other strong material.

The outer ring member's annular flange 34 has an inner surface defining a first concave wall portion 38, which cooperates with a second concave wall portion 58 formed in the outer collar member 50 to define a socket 70, as will be further described below.

Inner Ring Member

Figure 7A:
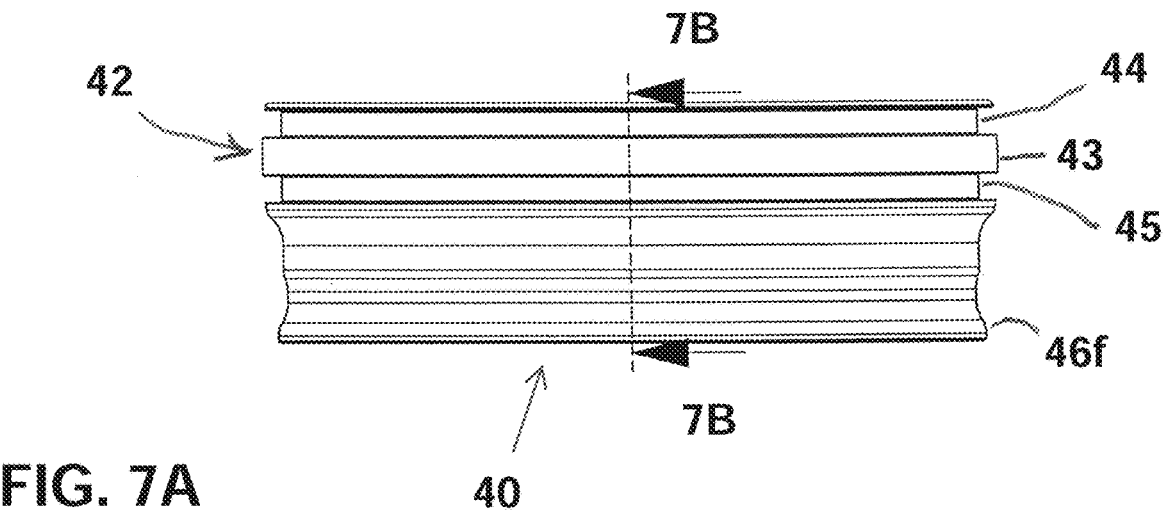
FIG. 7A is a side plan view of an inner ring member which is another component part of the fluid coupling assembly of FIG. 1A.
Figure 7B:
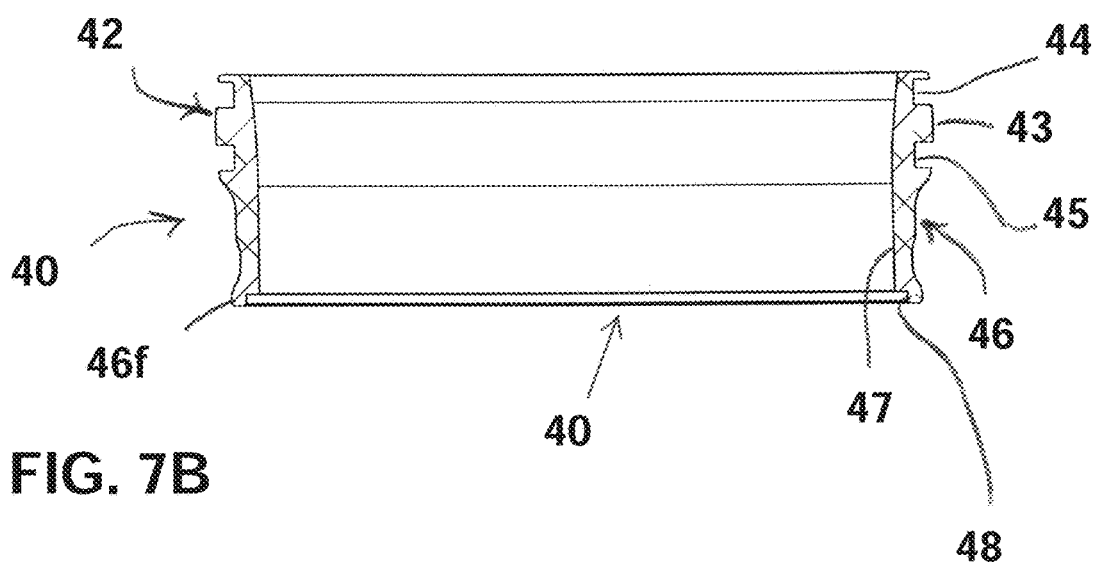
FIG. 7B is a central cross-sectional view of the inner ring member of FIG. 7A, taken along the line 7B-7B.

Referring now to FIGS. 7A-7B, the fluid coupling assembly 20 according to the illustrative embodiment also includes the generally cylindrical inner ring member 40, which may be formed of a metal or a high-strength plastic. The inner ring member 40 includes a first wall section 42 having a maximum diameter portion 43. The first wall section 42 fits nestingly inside of the concave wall portion 38 of the outer ring member 30.

The first wall section 42 has a convex outer surface, with at least one circumferential groove formed therein to receive a first sealing member. In the depicted embodiment, the first wall section 42 has two spaced apart circumferential grooves 44, 45 formed therein which receive two sealing members 60, which may be O-rings.

The inner ring member 40 also includes a second wall section 46, formed coaxially and integrally with the first wall section 42, and configured to be connected to a second pipe 92. The second wall 46 section has a medial portion 47 with an outside diameter smaller than a diameter of the maximum diameter portion 43 of the first wall section 42.

Optionally, the second wall section 46 may include a connecting flange 46*f* having a circular groove 48 formed therein to nestingly receive a portion of a second pipe, and the second pipe may be welded on to, or otherwise attached to the inner ring member 40 at the connecting flange 46*f*.

Outer Collar Member

Figure 8A:
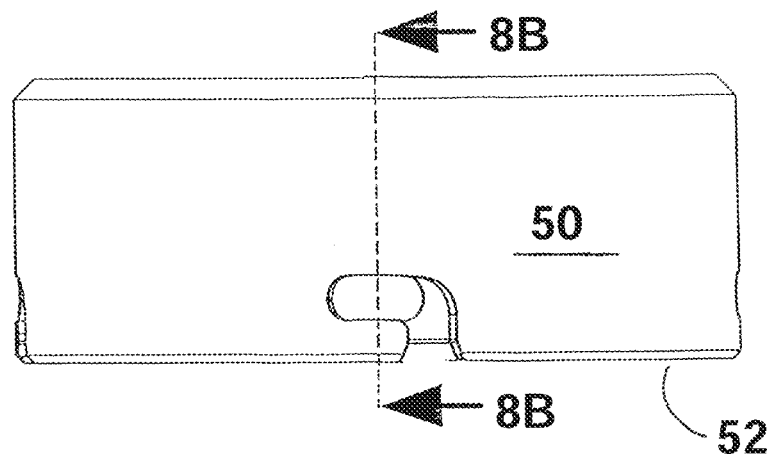
FIG. 8A is a side plan view of an outer collar member which is another component part of the fluid coupling assembly of FIG. 1A.
Figure 8B:
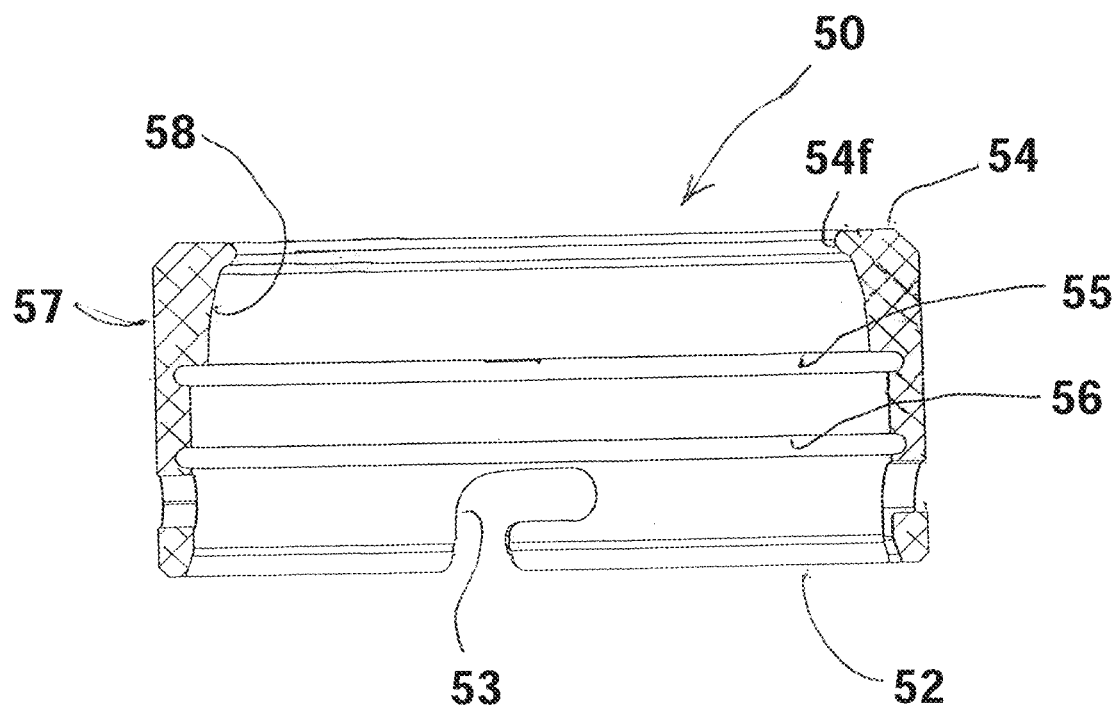
FIG. 8B is a central cross-sectional view of the outer collar member of FIG. 8A, taken along the line 8B-8B.

Referring now to FIGS. 8A-8B, the fluid coupling assembly 20 according to the illustrative embodiment also includes the generally cylindrical outer collar member 50 provided for selectively connecting to the outer ring member 30, and for adjustably joining the inner and outer ring members 40, 30 together such that in the assembled configuration of the fluid coupling assembly 20, the inner ring member 40 is pivotally movable in relation to the outer ring member 30.

The outer collar member 50 includes a connecting edge portion 52, having a second engaging structure 53 formed therein for selectively engaging the first engaging structure 33 of the outer ring member, to temporarily and disengageably lock the outer collar member 50 and the outer ring member 30 together while allowing such relative pivotal movement.

In the depicted embodiment, the second engaging structure 53 includes a plurality of substantially L-shaped cutouts formed in the side wall of the outer collar member 50 at the connecting edge portion 52. These L-shaped cutouts may extend through the entire width of the wall of the outer collar member 50 at the connecting edge portion 52.

Optionally, as shown in FIG. 8*c*, each of these L-shaped cutouts may be further modified to provide a retaining recess 53*d* in an innermost portion thereof, to allow the pins or fasteners 36 to "seat" in place in an installed configuration of the outer collar member 50, and to resist unintended movement of the outer collar member in relation to the outer ring member 30.

The sealing members 60 also help to create resistance to unwanted movement of the installed outer collar member 50, when it is mounted and locked in place on the outer ring member 30, and this resistance to movement helps to keep the pins or fasteners 36 in the retaining recesses 53*d* of the cutouts 53.

This can be described as a "bayonet mount", in which the plurality of radially extending fasteners 36 are provided on the outer ring member, the fasteners slidably insertable into the L-shaped cutouts of the outer collar member 50, and after the fasteners are fully inserted into the first section of the L-shaped cutouts, the outer collar member is then rotated to temporarily and disengageably lock the outer collar member to the outer ring member.

This mounting of the outer collar member 50 on the outer ring member 30 also keeps the inner and outer ring members together, while permitting limited pivotal movement of the inner ring member in the outer ring member.

The outer collar member 50 further has retaining structure, such as the widened wall portion shown at 54, extending radially inwardly thereon for supportively receiving the first wall section 42 of the inner ring member 40 therein, and for retaining the first wall section of the inner ring member in abutting engagement with the concave wall portion 38 of the outer ring member 30.

The widened wall portion 54 may include a radially inwardly extending retaining flange 54f, which extends around the inner circumference of the collar member 50 opposite the connecting edge portion 52.

Optionally, the outer collar member 50 may also have one or move internal circumferential groove(s) formed in an inner surface thereof, to receive another one or two of the sealing members. In the depicted embodiment, the outer collar member has two internal circumferential grooves 55, 56 formed therein to receive additional sealing members 62.

Also optionally, the outer collar member may have a cradle section 57 inside of the widened wall portion 54 and formed coaxially and integrally with the connecting edge portion 52, the cradle section having an inner surface defining a second concave wall portion 58, which is alignable with the concave wall portion 38 of the outer ring member 30 when the outer collar member 50 is joined thereto, as best seen in FIGS. 3A-3C.

In the depicted embodiment, the first and second concave wall portions 38, 58 cooperate to form a socket 70, which is configured to receive the convex first wall section 42 of the inner ring member and to form a modified ball and socket joint.

A comparison of FIGS. 3A, 3B and 3C shows the full range of travel of the inner ring member 30 inside of the socket 70 of such ball and socket joint.

Method of Using Fluid Coupling Assembly

The present invention also relates to a method of attaching two pipes together while permitting limited pivotal movement therebetween.

Figure 9:
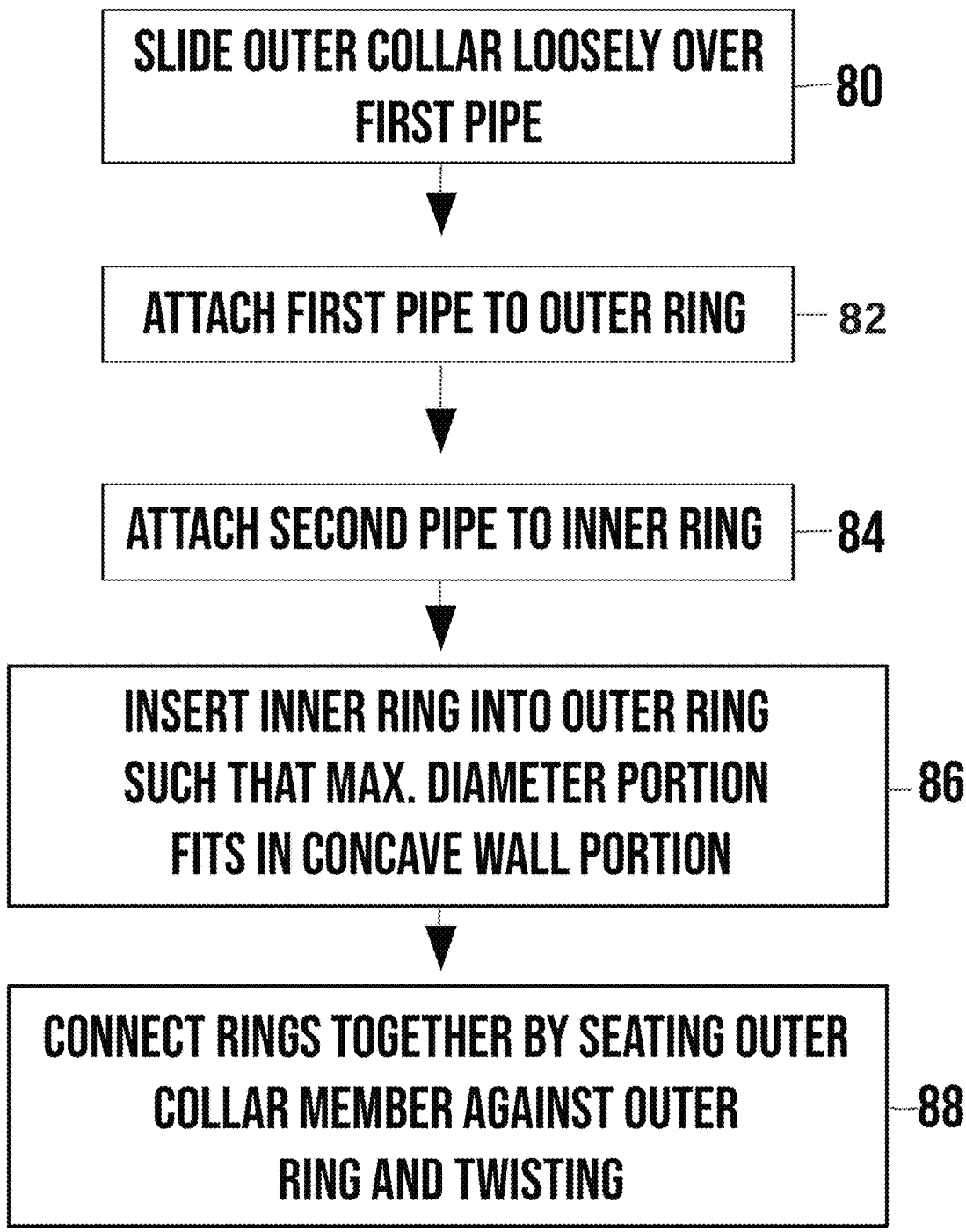
FIG. 9 is a flow chart depicting steps in an exemplary method according to the invention.

The method includes a first step of sliding an outer collar member 50 loosely over a first pipe 90. This step is shown at 80 in the flow chart of FIG. 9.

The method also includes a second step of attaching a first pipe 90 to an outer ring member 30 comprising a main ring body 32 having an inner diameter, the main ring body having an outer surface with a first engaging structure 33 thereon, and an annular flange 34 formed coaxially and integrally with the main ring body, the annular flange having an inner surface defining a concave wall portion 38. This step is shown at 82 in the flow chart of FIG. 9.

The method also includes a step of attaching a second pipe 92 to an inner ring member 40 comprising a first wall section 42 which fits nestingly inside of the concave wall portion 38 of the outer ring member 30, the first wall section having a convex outer surface 43 with at least one circumferential groove 44 formed therein to receive a first sealing member 62, the first wall section 42 having a maximum diameter portion, and a second wall section 46 formed coaxially and integrally with the first wall section, the second wall section having a medial portion 47 with an outside diameter smaller than the maximum diameter portion of the first wall section. This step is shown at 84 in the flow chart of FIG. 9.

The first through third steps 80, 82, 84 may be performed in any order.

The method also includes a step of inserting the inner ring member 40 into the outer ring member 30 such that the maximum diameter portion of the inner ring member fits nestingly inside of the concave wall portion 38 of the outer ring member. This step is shown at 86 in the flow chart of FIG. 9.

The method also includes a step of connecting the inner and outer ring members together by removably attaching the outer collar member 50 to the outer ring member 30, the outer collar member including the connecting edge portion 52 having the second engaging structure 53 formed therein and configured to interlock with the first engaging structure 33 of the outer ring member 30.

This step may include twisting the outer collar member 50 in relation to the outer ring member 30, and may further include seating the first engaging structure 33 in the retaining recesses 53d of the second retaining structure 53. This step is shown at 88 in the flow chart of FIG. 9.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. As one example, the fluid coupling assembly could be modified so that the entire socket 70 is formed in the concave wall portion 38 of the outer ring member 30. All such modifications, which are consistent with, or equivalent to the elements described herein are intended to be within the scope and spirit of the present invention.

What is claimed is:

1. A fluid coupling assembly for connecting two pipes together, comprising:
    an outer ring member having at least one cylindrical surface and a central axis, the outer ring member comprising
        a main ring body having an inner diameter and configured to be connected to a first pipe, the main ring body having an outer surface with a first engaging structure thereon, and
        an annular flange formed coaxially and integrally with the main ring body, the annular flange having an inner surface defining a concave wall portion;
    an inner ring member having at least one cylindrical surface, comprising:
        a first wall section which fits nestingly inside of the concave wall portion of the outer ring member, the first wall section having a convex outer surface with at least one circumferential groove formed therein to receive a first sealing member, the first wall section having a maximum diameter portion, and
        a second wall section formed coaxially and integrally with the first wall section and configured to be connected to a second pipe, the second wall section having a medial portion with an outside diameter smaller than the maximum diameter portion of the first wall section; and
    an outer collar member having at least one cylindrical surface for selectively connecting to the outer ring member and for adjustably joining the inner ring member and outer ring members together such that the inner ring member is pivotally movable in relation to the outer ring member, the outer collar member comprising a connecting edge portion having a second engaging structure formed therein for selectively engaging the first engaging structure of the outer ring to temporarily and disengagably lock the outer collar member to the outer ring member, the outer collar member further having retaining structure extending radially inwardly thereon for supportively receiving the first wall section of the inner ring member therein and for retaining the first wall section of the inner ring member in abutting engagement with the concave wall portion of the outer ring member, wherein the first sealing member is configured to contact the outer ring member and the outer collar member.

2. The fluid coupling assembly of claim 1, wherein an axis of the first pipe and an axis of the second pipe form an angle.

3. The fluid coupling assembly of claim 1, wherein the first engaging structure comprises a plurality of outwardly extending pin bosses arranged radially around the main ring body of the outer ring member and spaced apart from one another, and wherein the second engaging structure comprises a plurality of shaped grooves formed in the connecting edge portion of the outer collar member and configured to slidably receive the pin bosses of the outer ring member therein.

4. The fluid coupling assembly of claim 3, wherein the plurality of shaped grooves includes L-shaped cutouts.

5. The fluid coupling assembly of claim 1, wherein the inner ring member and outer ring member are connected together by twisting the outer collar member in relation to the outer ring member without threading outer collar member onto the outer ring member.

6. The fluid coupling assembly of claim 1, wherein the outer collar member is configured to connect and disconnect from outer ring member by twisting without use of a tool.

7. The fluid coupling assembly of claim 1, wherein the outer ring member is arranged between the outer collar member and the inner ring member.

8. A fluid coupling assembly for connecting two pipes together, said fluid coupling assembly comprising:

an outer ring member having at least one cylindrical surface and a central axis, the outer ring comprising a main ring body having an inner diameter and configured to be connected to a first pipe, the main ring body having first engaging structure affixed thereto, and an annular flange formed coaxially and integrally with the main ring body, the annular flange having a first concave wall portion with a tapered inner diameter which is larger than the inner diameter of the main ring body;

an inner ring member having at least one cylindrical surface, comprising:

a first wall section which fits nestingly inside of the first concave wall portion of the outer ring member, the first wall section having a convex outer surface with at least one circumferential groove formed therein to receive a first sealing member, and having a maximum diameter portion proximate the circumferential groove, and a second wall section formed coaxially and integrally with the first wall section and configured to be connected to a second pipe, the second wall section having a medial portion with an outside diameter smaller than the maximum diameter portion of the first wall section; and an outer collar member having at least one cylindrical surface for selectively connecting to the outer ring member and for adjustably joining the inner and outer ring members together, the outer collar member comprising a connecting edge portion having a second engaging structure formed therein for selectively engaging the first engaging structure of the outer ring member to temporarily and disengagably lock the outer collar member to the outer ring member, the outer collar member further having a cradle section formed coaxially and integrally with the connecting edge portion, the cradle section having an inner surface defining a second concave wall portion with at least one circumferential groove formed therein to receive a second sealing member, the outer collar member further having retaining structure extending radially inwardly thereon for supportively receiving the first wall section of the inner ring member therein and for retaining the first wall section of the inner ring member in abutting engagement with the concave wall portions of the outer ring member and the outer collar member, wherein the first sealing member is configured to contact the outer ring member and the outer collar member.

9. The fluid coupling assembly of claim 8, wherein an axis of the first pipe and an axis of the second pipe form an angle.

10. The fluid coupling assembly of claim 9, wherein the first engaging structure comprises a plurality of outwardly extending pin bosses arranged radially around a main ring body of the outer ring member and spaced apart from one another, and wherein the second engaging structure comprises a plurality of shaped grooves formed in the connecting edge portion of the outer collar member and configured to slidably receive the pin bosses of the outer ring member therein.

11. The fluid coupling assembly of claim 10, wherein the plurality of shaped grooves includes L-shaped cutouts.

12. The fluid coupling assembly of claim 8, wherein the first engaging structure comprises a plurality of outwardly extending pin bosses arranged radially around the main ring body of the outer ring member and spaced apart from one another, and wherein the second engaging structure comprises a plurality of shaped grooves formed in the connecting edge portion of the outer collar member and configured to slidably receive the pin bosses of the outer ring member therein.

13. The fluid coupling assembly of claim 8, wherein the inner ring member and outer ring member are connected together by twisting the outer collar member in relation to the outer ring member without threading outer collar member onto the outer ring member.

14. The fluid coupling assembly of claim 8, wherein the outer collar member is configured to connect and disconnect from outer ring member by twisting without use of a tool.

15. The fluid coupling assembly of claim 8, wherein the outer ring member is arranged between the outer collar member and the inner ring member.

16. A method of attaching two pipes together while permitting limited pivotal movement therebetween, said method comprising the steps of:

sliding an outer collar member over a first pipe;

attaching the first pipe to an outer ring member having a concave wall portion, the outer ring member having a first engaging structure;

attaching a second pipe to an inner ring member comprising a first wall section which fits nestingly inside of the concave wall portion of the outer ring member, the first wall section having a convex outer surface;

inserting the inner ring member into the outer ring member such that a maximum diameter portion of the inner ring member fits nestingly inside of the concave wall portion of the outer ring member;

connecting the inner and outer ring members together by removably attaching the outer collar member to the outer ring member, the outer collar member including a connecting edge portion having a second engaging structure formed therein, the second engaging structure interlocking with the first engaging structure of the outer ring member, wherein a sealing member disposed between the outer ring member and the outer collar member is configured to contact the outer ring member and the outer collar member.

17. The method of claim 16, wherein the step of connecting the inner and outer ring members together includes twisting the outer collar member in relation to the outer ring member without threading outer collar member onto the outer ring member.

* * * * *